United States Patent
Wursche et al.

(10) Patent No.: US 8,764,992 B2
(45) Date of Patent: Jul. 1, 2014

(54) METHOD OF FRACTIONATING OXIDIC NANOPARTICLES BY CROSSFLOW MEMBRANE FILTRATION

(75) Inventors: Roland Wursche, Duelmen (DE); Goetz Baumgarten, Haltern am See (DE); Wolfgang Lortz, Waechtersbach (DE); Michael Kroell, Linsengericht (DE)

(73) Assignee: Evonik Degussa GmbH, Essen (DE)

( * ) Notice: Subject to any disclaimer, the term of this patent is extended or adjusted under 35 U.S.C. 154(b) by 327 days.

(21) Appl. No.: 12/752,293

(22) Filed: Apr. 1, 2010

(65) Prior Publication Data

US 2010/0187174 A1    Jul. 29, 2010

Related U.S. Application Data

(62) Division of application No. 12/271,414, filed on Nov. 14, 2008, now abandoned.

(30) Foreign Application Priority Data

Nov. 15, 2007 (DE) .......... 10 2007 054 885

(51) Int. Cl.
- *B01D 61/14* (2006.01)
- *B01D 65/02* (2006.01)
- *B01D 33/15* (2006.01)
- *B01D 63/16* (2006.01)

(52) U.S. Cl.
USPC ........... 210/780; 210/788; 210/297; 210/636; 210/641; 210/651; 210/805; 210/806; 210/361; 210/367

(58) Field of Classification Search
None
See application file for complete search history.

(56) References Cited

U.S. PATENT DOCUMENTS

| 4,978,726 A | 12/1990 | Döhler et al. |
| 5,145,915 A | 9/1992 | Weitemeyer et al. |
| 5,146,005 A | 9/1992 | Weitemeyer et al. |
| 5,260,402 A | 11/1993 | Weitemeyer et al. |
| 5,622,628 A * | 4/1997 | Trendell et al. ............... 210/651 |
| 5,879,715 A * | 3/1999 | Higgins et al. ................ 424/489 |
| 6,211,322 B1 | 4/2001 | Döhler et al. |
| 6,268,404 B1 | 7/2001 | Döhler et al. |
| 6,478,969 B2 * | 11/2002 | Brantley et al. ............... 210/651 |
| 6,515,115 B1 * | 2/2003 | Kwant et al. .................. 536/6.5 |

(Continued)

FOREIGN PATENT DOCUMENTS

| DE | 199 50 496 A1 | 4/2001 |
| DE | 19950496 A1 * | 4/2001 |

(Continued)

OTHER PUBLICATIONS

Sweeney, S. F. et al. "Rapid Purification and Size Separation of Gold Nanoparticles via Diafiltration," J. Am. Chem. Soc. 2006, 128, 3190-3197.*

(Continued)

*Primary Examiner* — Krishnan S Menon
*Assistant Examiner* — Michelle Adams
(74) *Attorney, Agent, or Firm* — Oblon, Spivak, McClelland, Maier & Neustadt, L.L.P.

(57) ABSTRACT

A method of fractionating a dispersion of oxidic nanoparticles wherein at least one step of the method is a membrane crossflow filtration step, the flow of the dispersion over the membrane being brought about by means of driven rotating parts; and dispersions of oxidic nanoparticles that are obtainable by the method.

18 Claims, 4 Drawing Sheets

(56) References Cited

U.S. PATENT DOCUMENTS

| | | |
|---|---|---|
| 6,663,683 B2 | 12/2003 | Lortz et al. |
| 6,676,719 B2 | 1/2004 | Lortz et al. |
| 6,767,377 B2 | 7/2004 | Schumacher et al. |
| 6,808,769 B2 | 10/2004 | Batz-Sohn et al. |
| 6,991,190 B2 | 1/2006 | Lortz et al. |
| 7,015,270 B2 | 3/2006 | Scharfe et al. |
| 7,169,322 B2 | 1/2007 | Menzel et al. |
| 7,250,204 B2 | 7/2007 | Brand et al. |
| 7,276,541 B2 | 10/2007 | Döhler et al. |
| 7,374,787 B2 | 5/2008 | Lortz et al. |
| 7,553,465 B2 | 6/2009 | Katusic et al. |
| 7,598,334 B2 | 10/2009 | Ferenz et al. |
| 7,605,284 B2 | 10/2009 | Brueckner et al. |
| 7,615,577 B2 | 11/2009 | Lortz et al. |
| 7,635,581 B2 | 12/2009 | Ferenz et al. |
| 7,727,599 B2 | 6/2010 | Doehler et al. |
| 7,759,402 B2 | 7/2010 | Venzmer et al. |
| 7,776,989 B2 | 8/2010 | Ferenz et al. |
| 7,838,603 B2 | 11/2010 | Schwab et al. |
| 7,838,614 B2 | 11/2010 | Thum et al. |
| 7,855,265 B2 | 12/2010 | Thum et al. |
| 7,893,128 B2 | 2/2011 | Busch et al. |
| 8,021,632 B2 | 9/2011 | Baumgarten et al. |
| 8,138,294 B2 | 3/2012 | Henning et al. |
| 8,172,936 B2 | 5/2012 | Herrwerth et al. |
| 8,198,473 B2 | 6/2012 | Ferenz et al. |
| 8,211,972 B2 | 7/2012 | Meyer et al. |
| 8,226,829 B2 | 7/2012 | Wiese et al. |
| 2004/0067485 A1 | 4/2004 | Mayes et al. |
| 2004/0240062 A1 | 12/2004 | Lortz et al. |
| 2004/0251329 A1* | 12/2004 | Hsu et al. .................. 241/15 |
| 2005/0136269 A1 | 6/2005 | Doehler et al. |
| 2005/0169861 A1 | 8/2005 | Lortz et al. |
| 2005/0224749 A1 | 10/2005 | Lortz et al. |
| 2006/0104881 A1 | 5/2006 | Lortz et al. |
| 2006/0155090 A1 | 7/2006 | Ferenz |
| 2006/0163533 A1 | 7/2006 | Batz-Sohn et al. |
| 2006/0193764 A1 | 8/2006 | Katusic et al. |
| 2007/0048205 A1 | 3/2007 | Katusic et al. |
| 2007/0059539 A1 | 3/2007 | Doehler et al. |
| 2007/0123599 A1 | 5/2007 | Eilbracht et al. |
| 2007/0149723 A1 | 6/2007 | Schwab |
| 2007/0197678 A1 | 8/2007 | Cavaleiro et al. |
| 2007/0295243 A1 | 12/2007 | Dohler et al. |
| 2007/0299231 A1 | 12/2007 | Doehler et al. |
| 2008/0031806 A1 | 2/2008 | Gavenonis et al. |
| 2008/0051473 A1 | 2/2008 | Lortz et al. |
| 2008/0098932 A1 | 5/2008 | Perlet et al. |
| 2008/0187702 A1 | 8/2008 | Ferenz et al. |
| 2008/0264299 A1 | 10/2008 | Lortz et al. |
| 2009/0032465 A1 | 2/2009 | Baumgarten et al. |
| 2009/0136757 A1 | 5/2009 | Wursche et al. |
| 2010/0036011 A1 | 2/2010 | De Gans et al. |
| 2010/0210445 A1 | 8/2010 | Von Rymon Lipinski et al. |
| 2010/0248325 A1 | 9/2010 | Eckstein et al. |
| 2010/0266651 A1 | 10/2010 | Czech et al. |
| 2010/0298485 A1 | 11/2010 | Frey et al. |
| 2011/0042004 A1 | 2/2011 | Schubert et al. |
| 2011/0046305 A1 | 2/2011 | Schubert et al. |
| 2011/0070175 A1 | 3/2011 | Herrwerth et al. |
| 2011/0091399 A1 | 4/2011 | Meyer et al. |
| 2011/0230619 A1 | 9/2011 | Kuppert et al. |
| 2011/0230633 A1 | 9/2011 | Ferenz et al. |
| 2011/0251070 A1 | 10/2011 | Poffenberger et al. |
| 2011/0268642 A1 | 11/2011 | Brausch et al. |
| 2012/0010302 A1 | 1/2012 | Hartung et al. |
| 2012/0035382 A1 | 2/2012 | Priske et al. |
| 2012/0046503 A1 | 2/2012 | Priske et al. |

FOREIGN PATENT DOCUMENTS

| | | |
|---|---|---|
| WO | 97/19745 | 6/1997 |
| WO | 98/45019 | 10/1998 |
| WO | 01/32799 A1 | 5/2001 |
| WO | 2006/116798 A1 | 11/2006 |

OTHER PUBLICATIONS

Devgan, U. "Peristaltic, venturi pumps vary in function, settings," Ocular Surgery News India Edition Dec. 1, 2007; accessed on the internet at URL <http://www.osnsupersite.com/view.aspx?rid=25049> on May 5, 2011.*

Software translation for Hoemmerich, DE-19950496-A1, Apr. 2001.*

Weigert, T. et al. "CrossFow electrofiltration in pilot scale," Journal of Membrane Science 159 (1999) 253-262.*

Bouzerar, R. et al. "Influence of Geometry and Angular Velocity on Performance of a Rotating Disk Filter," AIChE Journal 2000, 46, 257-265.*

A. Akthakul, et al., Advanced Materials, vol. 17, No. 5, pp. 532-535 (2005).

S. Kim, et al., Journal of Membrane Science, vol. 284, pp. 361-372 (2006).

P.K. Kang, et al., Langmuir, vol. 13, No. 6, pp. 1820-1826 (1997).

R. Liu, et al., Analytical Chemistry, vol. 78, No. 23, pp. 8105-8112 (2006).

* cited by examiner

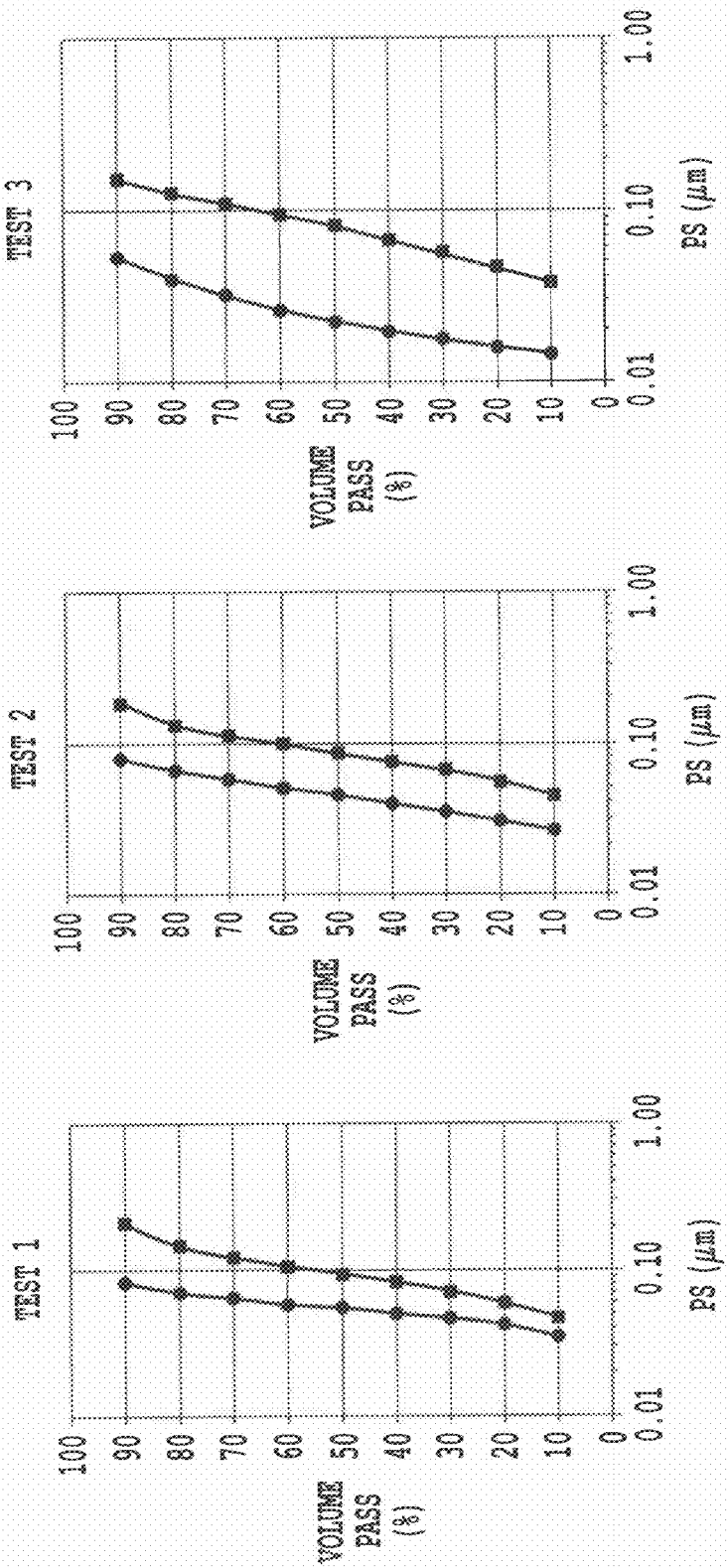

Fig. 3A
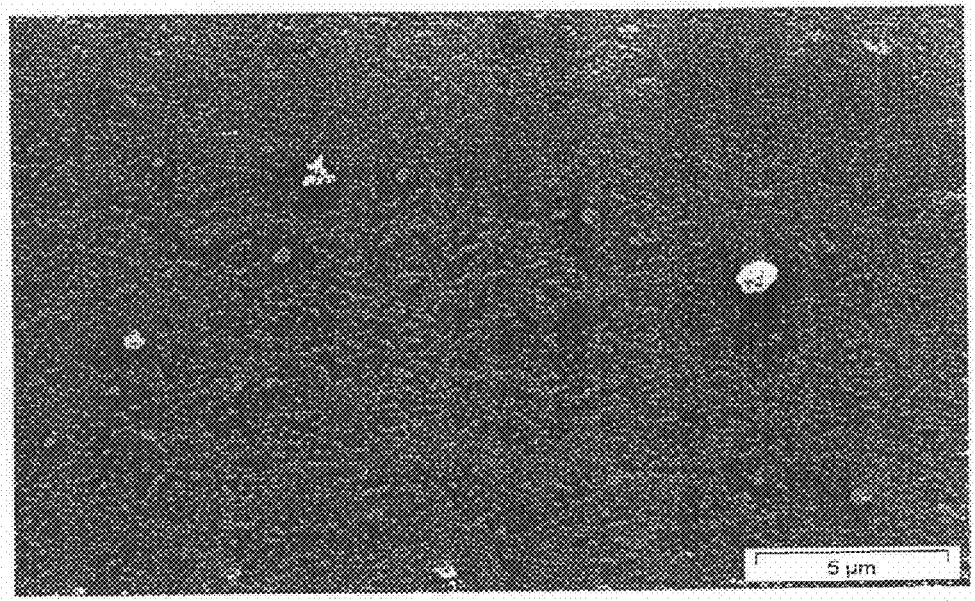
Feed
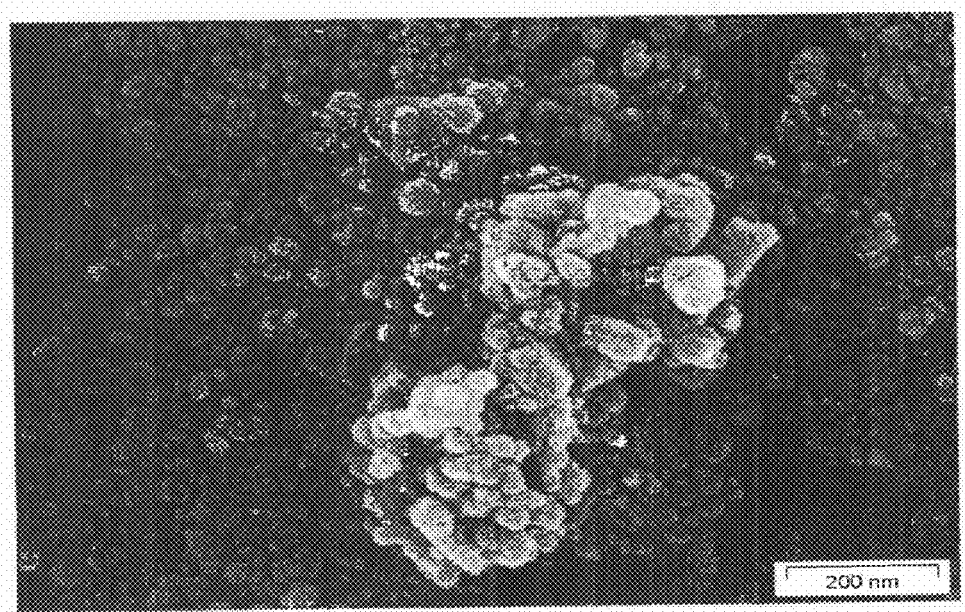

Fig. 3B
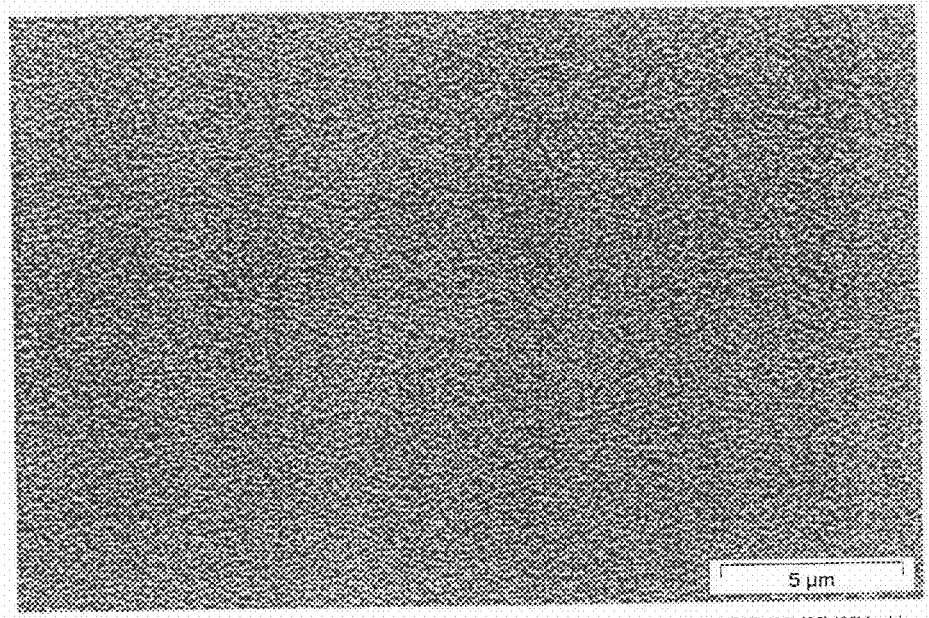
Permeate
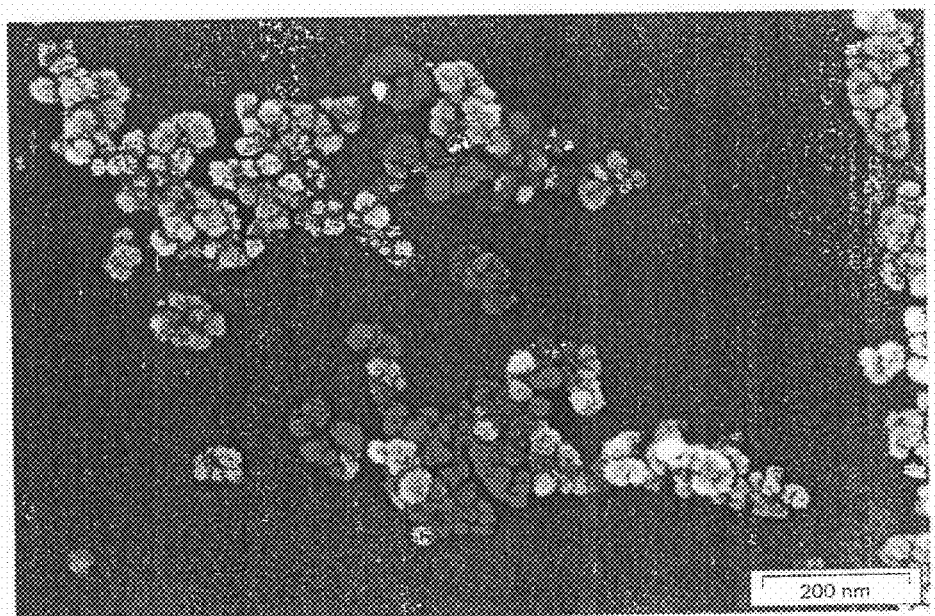

METHOD OF FRACTIONATING OXIDIC NANOPARTICLES BY CROSSFLOW MEMBRANE FILTRATION

This is a divisional application of U.S. application Ser. No. 12/271,414, filed Nov. 14, 2008.

BACKGROUND OF THE INVENTION

1. Field of the Invention

The present invention relates to a method of fractionating dispersions of oxidic nanoparticles by membrane filtration. It further relates to dispersions of oxidic nanoparticles that are obtained by the method of the invention.

2. Description of the Background

Recent years have seen a steady increase of interest, from both academia and industry, in nanoscale particles, in other words particles with a diameter of less than 1 µm, since the properties of nanoparticles have caused them to be ascribed great potential in respect of applications in, for example, electronics, optics, and chemical products. Of particular interest in this context are particles whose diameter is in the range below 100 nm. It is here, usually, that the effects known as "nano-effects" occur, quantum effects for example, which can be attributed to factors that include the influence of the large particle surface area. With these particles, moreover, light scattering decreases to such an extent that it is possible to observe increasing transparency in "nano-composites", in which the particles described are embedded in a matrix, frequently of polymers or coating materials, in order to enhance their properties.

For the application of nanoparticles in composites, however, it is important that the spherical particles first do not agglomerate and second are present in a narrow size distribution. Even small fractions of relatively coarse particles or of agglomerates may adversely affect the properties of the composites. This is true in particular for transparency. Nanoparticles are often adapted to the specific matrix by being modified, the aim of such modification being to produce better dispersion and hence to prevent agglomerates forming.

There are a variety of methods by which the synthesis of nanoparticles can be performed. In addition to gas-phase synthesis, it is possible to operate in solution, and in that case templates are sometimes used. Another option is to grind coarser particles. A feature of this approach is that it is more cost-effective than synthesis from molecular precursors.

Whether from the synthesis of the particles from molecular precursors or from grinding, the resulting product always has a size distribution. Whereas, in the case of particles in the micrometer range, separation of relatively coarse particles can be achieved via sedimentation, centrifugation or screen filtration, these methods are of only limited utility in the case of nanoparticles. If the nanoparticles are in a dispersion, coarser particles may possibly also be separated off via sedimentation or centrifugation, but in this case the extreme surface-area and time requirements, along with the batch operating regime, are so disadvantageous that these methods can in practice be of virtually no importance. Similarly, techniques such as size exclusion chromatography (SEC) or gel electrophoresis are unsuited to relatively large quantities.

For many applications, nanoparticles that are of interest are those composed of metal oxides, as, for example, for the production of UV-protected polymer composites or of fluorescent materials (Journal of Nanoscience and Nanotechnology, 2006, 6, 409-413). For industrial practice, therefore, it would be useful to have a continuous, easily implemented method available for the fractionation of oxidic nanoparticles. There have been a number of proposals to use membrane filtration methods for this purpose. It should be noted here that separation on a membrane is influenced by the specific interaction between particle and membrane.

In order, generally, to separate particles from suspensions according to specified criteria such as particle diameter, for example, it is common to employ filtration techniques. In that case, dead-end filtrations, as a batch operation, or crossflow filtrations, as a dynamic operation, are generally used. In the case of dead-end filtration, the entire volume to be filtered is passed directly through the filtration medium, and in this case the particles deposited are generally able to build up a cake, which in turn critically co-determines the outcome of the filtration. The filtration outcome here, then, is determined not only by the properties of the filtration medium but also, in particular, by the filter cake which has formed and which changes during the operating time. Cake-forming filtration, accordingly, cannot be used to classify particle dispersions. Only depth filtration, which operates in accordance with the dead-end method, is able, within certain limits, to effect classification, by virtue of the fact that the particles to be separated penetrate the structure of the filter medium and are separated on the basis of their adhesion to the internal surface area of the filter medium. The limits on this method are that only very dilute dispersions can be treated and that the classifying effect has a high inherent imprecision; as a result of this, significant amounts of the target product remain adhering in the filter medium and are therefore lost.

In the case of crossflow filtration, the medium to be filtered is conveyed tangentially over the filtration medium. It is the pore size of the filtration medium that determines the cut-off limit. Important applications are in microfiltration, ultrafiltration and nanofiltration.

Crossflow filtration attempts to circumvent the disadvantages of the dead-end filtration method by virtue of the fact that, in this case, in contrast to the conventional filtration, the flow impinging on the filter medium is tangential. The feed stream is divided into a filtration stream through the filter medium and the flow over and parallel to the filter medium. In membrane technology, the flow which passes through the membrane is termed the permeate. The material retained on the membrane is termed the retentate. As a result of this flow regime, the retained component is transported back from the surface of the filtration medium into the retentate flow. Hence this counteracts the formation of deposits and cake layers on the filtration medium.

Advanced Materials 2005, 17 (5), 532-535 describes how the technique of membrane crossflow filtration can be utilized for fractionating metallic nanoparticles. For that purpose a special membrane is produced that contains nanoscale channels. The experiments were conducted on the very small laboratory scale, and do not offer any indications of transfer to the industrial scale. Nothing meaningful is said about either the pore radius or the composition of the membranes necessary for fractionating oxidic nanoparticles. Moreover, it is observed that classification of nanoparticles is not possible with conventional membranes.

Journal of Membrane Science 2006, 284, 361-372 describes the crossflow membrane filtration of a dispersion of silicon dioxide nanoparticles. However, no details are given here of the possibility of fractionation; instead, the investigation was of the formation from the nanoparticles of a dynamic cake layer, which renders fractionation impossible.

The firm Bokela, Karlsruhe (Germany) markets a screen filtration system (Dynofilter) which allows coarse fractions of down to 10 µm to be separated from a particle dispersion by dynamic screen filtration. As far as the possibility of using membranes in this system is concerned, nothing is known.

Langmuir 1997, 13, 1820-1826 describes investigations of the membrane filtration of polymer particles with a permanent surface charge. There, the retention of nanoparticles is improved by deliberate introduction of surface charges. As far as classifying effects are concerned, nothing is stated.

Anal. Chem. 2006, 78, 8105-8112 outlines how organic colloids are separated from aqueous solution by crossflow ultrafiltration. The membrane there retains more than 99% of nanoparticles.

US 2004/0067485 A1 describes the synthesis of nanoscale semiconductors based on zinc and cadmium, combined with the elements S, Se and Te, using a protein as a template. It is indicated that the resulting complex of, for example, zinc sulphide/apoferritin may be able to be fractionated by dead-end membrane filtration, the diameter of the pores of the membrane used being significantly higher than the diameter of the particles. A large selection of membrane materials is cited, but with no examples for the filtration method. With this method it is not possible to carry out classifying nanoparticle filtration on an industrial scale, since a filter cake would be formed. Consequently, the proposed method remains able to be carried out on a laboratory scale only, where the frequent change of filter required is easily possible.

WO 2006/116798 A1 describes the production of radioactive nanoparticles based on metallic technetium, these particles undergoing a dead-end membrane filtration procedure. The membrane used in that procedure is hydrophilic. Here as well, therefore, the dead-end method is used, which even with a low level of nanoparticle agglomeration results in virtually complete deposition of all the particles on the membrane. The method proposed there for nanoparticle fractionation can therefore be carried out only at very low nanoparticle concentrations and on a laboratory scale.

In the prior art there is no known membrane method which can be used on an industrial scale and in which a fine fraction can be classified out of a particle dispersion which contains predominantly nanoparticles but also coarser particles. All of the prior art methods form a cake layer on the membrane surface, and so, although separation is made possible, the classification of nanoparticles from a dispersion is not.

SUMMARY OF THE INVENTION

It was the object of the present invention, therefore, to provide a method of fractionating a dispersion of metal-oxide nanoparticles that overcomes the disadvantages of the prior art, and especially the build-up of a cake layer on the membrane, and hence allows nanoparticles to be classified, even on an industrial scale.

This object is achieved by a method of fractionating a dispersion of oxidic nanoparticles wherein at least one step of the method is a membrane crossflow filtration step, the dispersion being caused to flow over the membrane by means of driven rotating parts.

Surprisingly it has been found that through the method of the invention, build-up of a cake layer on the membrane is prevented and fractionation of a dispersion of oxidic nanoparticles is made possible.

BRIEF DESCRIPTION OF THE DRAWINGS

FIGS. 2A, 2B and 2C show particle size distribution for Tests 1 to 3, respectively, of the Examples.

FIGS. 3A and 3B show scanning electron micrographs for Test 3 of the Examples.

DETAILED DESCRIPTION OF THE INVENTION

Figure 1:
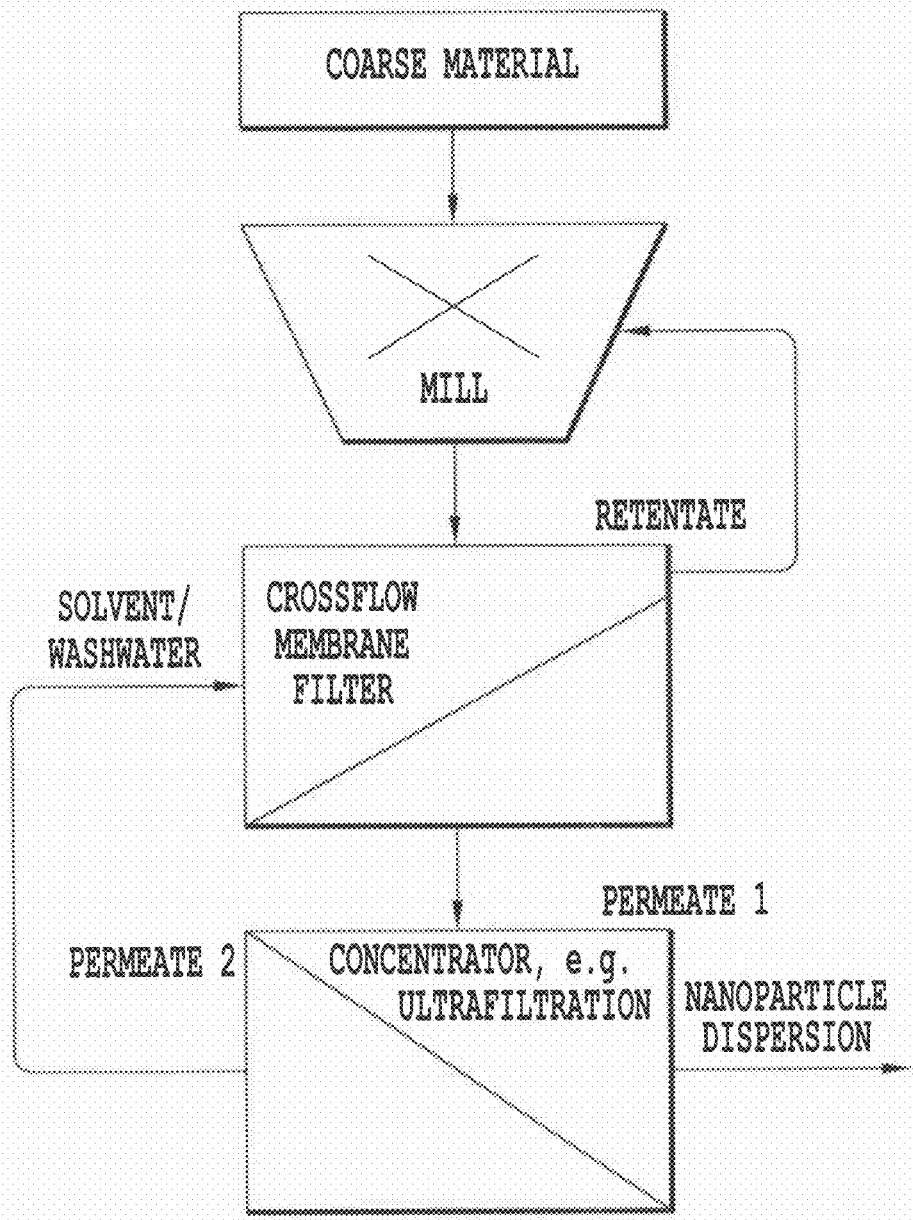
FIG. 1 shows a flow diagram of one possible operating regime according to the present invention.

The method of the invention is carried out with a filtration unit which operates on the cross rotation (CR) principle. These are filtration machines in which shearing forces and flows are generated parallel to the filter medium by moving internals. This may also involve the filter medium itself (e.g. rotating membranes). One possible version of a filter machine of this kind is the cross rotation filter. In contrast to cross flow filtration, cross rotation filtration uses additional rotors to decouple the flow over the membrane from the feed and from the build-up of pressure. In a typical CR filter, filtration media and rotors are stacked one above the other in a sandwich formation. In the middle of the stack there is a rotating shaft which drives the rotors, allowing average cross-flow velocities—that is, cross-flow velocities averaged spatially over the entire filter medium—of well above 6 m/s to be achieved. The medium fed in is guided in layers through the plate stack. In the sections of the plate stack, the medium is concentrated in stages. By decoupling the feed (by a pump) and the flow over the membrane (by rotors), high specific filtrate fluxes in tandem with low system pressures are achieved. These systems with rotating internals have to date been used in applications requiring the separation of very small particles or sticky substances and requiring very high concentration.

Microfiltration, ultrafiltration and nanofiltration are also included among pressure-driven membrane processes. Structures referred to as membranes are generally two-dimensional structures which form a barrier between two fluid phases and allow selective exchange of material between the two sides. The membrane, accordingly, is a filter medium which has a defined cut-off limit, or retains particles of a certain size in the presence of a driving force (pressure). The nature of the driving force, and also the pressure and flow conditions at the membrane, in conjunction with the nature of the membrane, determine the separation outcome. The division of synthetic membranes into different classes is made on the basis of their structures and aggregate states and their electrochemical characteristics. A membrane in the sense used here has pores with a diameter of up to 10 µm. If it has larger pore diameters, the structure is referred to as a sieve.

Any membrane material may be used. As a membrane it is possible to use any commercially available membrane, made of polyethylene, polytetrafluoroethylene, polysulphone or cellulose, for example. Symmetrical membranes are preferred, i.e. membranes which have a constant pore diameter over their entire cross section. The membranes used in accordance with the invention have a pore diameter of up to 10 µm, preferably between 0.01 and 5 µm, more preferably between 0.1 and 1 µm.

The average cross-flow velocities generated in the method of the invention amount to between 5 and 25 m/s, preferably at least 8 m/s, and more preferably at least 10 m/s. These conditions are realized in the form of a relative velocity between the medium to be filtered and the membrane, through the rotation of internals (e.g. stirrers). The average cross-flow velocity is determined by measuring the velocity over the filtration medium as a whole and then forming the average. It is particularly advantageous in this context that this cross-flow velocity be decoupled from the build-up of pressure, thereby producing the aforementioned high cross-flow velocities at low transmembrane pressures (<1 bar). Under these kinds of conditions it is possible almost completely to prevent the construction of a cake layer. Additionally, the construction of the cake layer can be countered by periodic backwashing of the membrane with permeate or a liquid (e.g. water) or a liquid/gas mixture (e.g. water and compressed air).

Nanoparticles used in the sense of the method of the invention may be particles of any metal oxides. The metal oxides may be prepared, for example, by flame pyrolysis, precipitation processes or sol-gel operations. The metal oxides may also be mixed oxides, deriving from two or more different metals. Preference is given to nanoparticles of titanium oxide, cerium oxide, aluminium oxide, silicon dioxide, zirconium dioxide, zinc oxide, indium tin oxide, antimony tin oxide, barium titanate or of mixed oxides which contain these components. In the dispersion it is also possible, furthermore, for two or more different metal oxides to be present in the form of mixtures. The preparation of dispersions of metal-oxide nanoparticles by grinding in the liquid phase may take place as described in DE 10204470 A1, for example. The principle of tiring liquid jets at one another under high pressure, causing their collision and, consequently, reducing the size of, and dispersing, the material they contain is also referred to as wet-jet milling. As an inevitable concomitant of their production, such dispersions have an asymmetrical particle size distribution. Other techniques for producing dispersions include, for example, the use, alone or in combination, of jet mills, stirred ball mills, ultrasonic dispersing equipment, rotor-stator machines, Ultra-Turrax, planetary kneaders/mixers or high-pressure homogenizers. The dispersions formed with such techniques may also have symmetrical particle size distributions, and are likewise suitable for the method of the invention.

The dispersion used for the purposes of the method described may be obtained, for example, directly from a metal oxide from synthesis, or by redispersion of the solids fraction of a previously dried dispersion of the same metal oxide. Before or else during the dispersing operation it is possible, for example, to add dispersing assistants, to adjust the pH, or to carry out chemical surface modification of the metal oxide (for example, by using reactive silane compounds or compounds which bind to the particles electrostatically). This also applies in the case where a metal oxide is redispersed. The liquid component utilized for the dispersion may be water, water-based liquids, organic liquids or ionic liquids, or mixtures of two or more representatives of one of the stated groups, or mixtures of representatives from different groups. The liquids in question may also be solutions.

Additionally, in the liquid component of the dispersion, there may still be dissolved or sufficiently finely dispersed constituents present, examples being stabilizers, inhibitors, anti-ageing agents, biocides, dyes, antistats, salts, surface-active substances or corrosion control agents.

In one particular embodiment of the method of the invention, as illustrated in FIG. 1, the membrane crossflow filtration step is coupled with an upstream milling process in such a way that coarse material separated off (retentate) is returned to the grinding operation, and the fine fraction (permeate 1) is removed from the operation. The permeate 1 is then brought to a higher solids content, if appropriate, by a step of separation and/or concentration, by means of ultrafiltration, for example, while the permeate 2, which is obtained in the concentration procedure, is substantially free of nanoparticles and is referred to below as the clear fraction, or a condensate corresponding to the permeate 2, is returned to the operation i.e. to the preceding filtration step, as "washwater". It is, however, also possible to add "washwater" from external sources. In one preferred embodiment the retentate of the filtration step is washed via diafiltration. In that case new "washwater" is supplied continuously to the retentate until the old "washwater" has been fully replaced via the membrane, and residual nanoparticles present in the retentate have passed through the membrane into the permeate. Another possibility would be to meter them back to the grinding operation. In one preferred embodiment the entire operation takes place continuously.

Thus, FIG. 1 shows the basic flow diagram of one possible operating regime.

In order to separate the fine fraction from a dispersion more substantially, it may be necessary to use additional "washwater", where appropriate in conjunction with dispersion medium. Instead of the term water or "washwater" it is also possible, more generally, to use the term liquid, since, as well as water and water-based liquids, liquid organic compounds or ionic liquids are also suitable. The liquids may also be mixtures of two or more compounds from the same class of substance, or mixtures of individuals from the stated groups of liquids, which not only may form the basis of the nanoparticle dispersion but may also be utilized as "washwater".

The present invention is described in more detail by the working examples below, without any intention that its scope of protection should be limited as a result.

EXAMPLES

The tests below were performed on a 30% dispersion of titanium dioxide in water, as may be prepared, for example, by a process which is described in DE 10204470 A1. The dispersion used has a $D_{50}$ value of approximately 0.09 µm and also a $D_{90}$ value of approximately 0.2 µm; that is, 50% of the particles have a diameter less than or equal to 0.9 µm, and 90% have a diameter less than or equal to 0.2 µm.

The following commercially available membranes from Millipore were used:

Test 1: polytetrafluoroethylene membrane with a pore diameter of 1 µm

Test 2: polytetrafluoroethylene membrane with a pore diameter of 0.45 µm

Test 3: polytetrafluoroethylene membrane with a pore diameter of 0.2 µm

The stirrer speed was 1264 $min^{-1}$ in each case. This corresponds to an average cross-flow velocity of approximately 9 m/s.

As shown in FIGS. 2A, 2B and 2C, the particle size distribution was measured both before (measurement series with angular measurement points) and after (measurement series with circular measurement points) fractionation.

In addition, and as shown in FIGS. 3A and 3B, scanning electron micrographs were taken of the dispersion from Test 3, at two different resolutions (UHR detector, high voltage, 10 and 20 kV).

The results of Tests 1 to 3 make it forcefully clear that, through the method of the invention, the particle size distribution of the dispersion employed is shifted towards smaller particle sizes in such a way that, after fractionation has been accomplished, there are no particles with a diameter of 100 nm or more in the dispersion. This finding is also supported, in a purely qualitative way, by the scanning electron micrographs.

The complete description in German priority application DE 102007054885.2, filed Nov. 15, 2007, is hereby incorporated by reference.

The invention claimed is:

1. A method of fractionating a dispersion comprising predominantly oxidic nanoparticles and also coarser oxidic particles, thereby obtaining a finer fraction of oxidic nanoparticles, the method comprising
    filtrating via a membrane cross rotation filtration device, which comprises causing the dispersion to flow over a membrane by driven rotating parts,
    wherein the membrane cross rotation filtration device comprises a filtration media part and a rotor part that are stacked one above the other in a sandwich formation, and the membrane cross rotation filtration device further comprises a rotation shaft that drives the rotor part, the rotation shaft positioned in the middle of the sandwich formation,
    wherein the dispersion is stirred directly over the membrane,
    wherein the dispersion is caused to flow over the membrane with an average flow velocity of between 5 and 25 m/s, and
    wherein said filtrating produces a retentate and a filtrate, and said finer fraction of oxidic nanoparticles is present in the filtrate.

2. A method according to claim 1, wherein the membrane has a pore diameter of between 0.01 µm and 5 µm.

3. A method according to claim 1, wherein the membrane has a pore diameter of between 0.1 µm and 1 µm.

4. A method according to claim 1, wherein the dispersion is caused to flow over the membrane with an average flow velocity of 8 m/s to 25 m/s.

5. A method according to claim 1, wherein the dispersion is caused to flow over the membrane with an average flow velocity of 10 m/s to 25 m/s.

6. A method according to claim 1, wherein the oxidic nanoparticles are particles of at least one of titanium oxide, cerium oxide, aluminum oxide, silicon dioxide, zirconium dioxide, zinc oxide, indium tin oxide, antimony tin oxide, and barium titanate.

7. A method according to claim 1, wherein a grinding step is carried out after the filtrating step.

8. A method according to claim 7, wherein the grinding step is performed with a ball mill, stirred ball mill or wet-jet mill.

9. A method according to claim 1, wherein the retentate is washed via a diafiltration.

10. A method according to claim 9, wherein the retentate is subjected to a grinding step which is carried out after the filtrating step.

11. A method according to claim 1, wherein the filtrate is concentrated in a subsequent separation step.

12. A method according to claim 11, wherein the subsequent separation step is an ultrafiltration step.

13. A method according to claim 11, wherein the subsequent separation step produces a clear fraction, which clear fraction is recycled.

14. A method according to claim 1, wherein the filtrating step takes place with periodic backwashing of the membrane.

15. A method according to claim 1, wherein the dispersion has been diluted from a previous dispersion prior to the filtrating step.

16. A method according to claim 1, wherein at least 50% of the finer fraction of oxidic nanoparticles have a particle diameter of less than or equal to 80 nm.

17. A method according to claim 1, wherein at least 50% of the finer fraction of oxidic nanoparticles have a particle diameter of less than or equal to 50 nm.

18. A method according to claim 1, wherein at least 50% of the finer fraction of oxidic nanoparticles have a particle diameter of less than or equal to 30 nm.

* * * * *